United States Patent
Ahn et al.

(10) Patent No.: US 6,539,008 B1
(45) Date of Patent: *Mar. 25, 2003

(54) METHOD FOR INSERTING POWER CONTROL BITS IN THE CDMA MOBILE SYSTEM

(75) Inventors: Jae-Min Ahn, Seoul (KR); Young-Ky Kim, Seoul (KR); Soon-Young Yoon, Seoul (KR); Hee-Won Kang, Seoul (KR); Felix Kwang-Wook Yie, Seoul (KR); Seung-Hyun Kong, Seoul (KR)

(73) Assignee: Samsung Electronics, Co., Ltd. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/183,989

(22) Filed: Nov. 2, 1998

(30) Foreign Application Priority Data

Nov. 3, 1997 (KR) .............................. 97-57822

(51) Int. Cl.⁷ ........................... H04B 7/005; H04B 7/00
(52) U.S. Cl. ...................... 370/342; 370/311; 370/343; 370/345; 370/441; 370/442; 370/458; 370/478; 370/483; 370/484; 370/498; 370/529; 370/913; 375/130; 375/131; 375/140; 455/517; 455/522
(58) Field of Search ................................. 370/215, 311, 370/342, 343, 345, 441, 442, 458, 478, 480, 483, 484, 498, 529, 913; 375/130, 131, 140; 455/500, 507, 517, 522

(56) References Cited

U.S. PATENT DOCUMENTS

| | | | | |
|---|---|---|---|---|
| 4,914,651 A | * | 4/1990 | Lusignan | 370/69.1 |
| 5,603,096 A | * | 2/1997 | Gilhousen et al. | 455/69 |
| 5,621,723 A | * | 4/1997 | Walton et al. | 370/18 |
| 5,717,713 A | * | 2/1998 | Natali | 375/200 |
| 5,751,763 A | * | 5/1998 | Bruckert | 375/200 |
| 5,822,318 A | * | 10/1998 | Tiedemann, Jr. et al. | 370/391 |
| 6,031,827 A | * | 2/2000 | Rikkinen et al. | 370/330 |
| 6,075,814 A | * | 6/2000 | Yamano et al. | 375/222 |
| 6,084,904 A | * | 7/2000 | Wang et al. | 375/130 |
| 6,160,791 A | * | 12/2000 | Bohnke | 370/208 |
| 6,330,462 B1 | * | 12/2001 | Chen | 455/572 |

* cited by examiner

Primary Examiner—Hassan Kizou
Assistant Examiner—Joe Logsdon
(74) Attorney, Agent, or Firm—Dilworth & Barrese, LLP

(57) ABSTRACT

A power control bit inserting method between a base station and a terminal. The base station and the terminal each use a plurality of adjacent frequency bands as signal paths with independent signal paths of a real part and an imaginary part given to each frequency. In the power control bit inserting method, a unit time is set to a power control group period, n-bit data is allocated to each signal path, the power control group period is divided by the number of signal paths, and a power control bit is inserted in each divided segment, so that the insertion positions in the real and imaginary parts of each frequency are spaced from each other by n/2 bit and the start position of the real signal path of each frequency is inserted at an appointed bit position of the corresponding frequency.

16 Claims, 12 Drawing Sheets

METHOD FOR INSERTING POWER CONTROL BITS IN THE CDMA MOBILE SYSTEM

BACKGROUND OF THE INVENTION

1. Field of the Invention

The present invention relates generally to CDMA (Code Division Multiple Access) mobile communication systems, and in particular, to a method for performing high speed power control.

2. Description of the Related Art

Power control is essential to the smooth operation of a CDMA system. Because all users share the same RF band through the use of PN codes, each user looks like random noise to other users. The power of each user, therefore, must be carefully controlled so that no one user is unnecessarily interfering with others who are sharing the same band.

The importance of power control in a CDMA system is best illustrated by way of example. Referring to FIG. 12, there is illustrated a single cell that has two hypothetical users. Examining the reverse link, which is often the limiting link in CDMA, it is shown that user 2 is much closer to the base station than user 1. If there is no power control, both users would transmit a fixed amount of power $p_t$. If it is assumed, for example, that the difference in distance is such that $p_{t,2}$ is 10 times more than $p_{t,1}$ then user 1 would be at a great disadvantage. It is apparent that user 2 has a much higher signal-to-noise ratio (SNR), and as such enjoys a great voice quality. Geographical factors can also influence disparities between users. Irrespective of whether the disparity results from distance or geography, this inequity is known as the classic near-far problem. Closed Loop Power control is commonly implemented to overcome the near-far problem and to maximize capacity. Closed Loop Power control is where the transmit power from each user is controlled such that the received power of each user at the base station is equal to one another. When this occurs, a greater number of users can be accommodated by the system.

In closed Loop power control when the received signal strength from a mobile terminal is excessively large, a control signal for reducing the transmit power of the terminal is transmitted from the base station to the terminal. Likewise, when the transmit power of a terminal is small, a control signal for increasing the transmit power of the terminal is transmitted from the base station to the terminal. In so doing, the received signal strength is maintained at an acceptable level in the base station. It is to be appreciated that the method has equal applicability with respect to the reverse link (i.e., signals received by the terminal from the base station).

FIG. 1 is a schematic block diagram of the single cell described in FIG. 1 comprising a single base station 20 and a single terminal 10. Closed Loop Power control, as performed in the prior art, will be described with reference to FIG. 1.

Referring to FIG. 1, a signal strength measurer 12 of a terminal 10 measures the signal strength of a forward link channel, and reports the measurement to a power control bit generator 13. Then, the power control bit generator 13 compares the received signal strength with a reference strength and generates a corresponding power control bit. If the received signal strength is larger than the reference strength value, the power control bit generator 13 generates a power control bit for reducing the transmit signal of the base station 20. If, however, the received signal strength is smaller than the reference strength value, the power control bit generator 13 generates a power control bit for increasing the transmit signal of the base station 20. The generated power control bit is inserted into a transmit signal of the terminal and transmitted to the base station 20. The insertion is performed in a power control bit inserter 14 of the terminal 10.

A power control bit detector 25 of the base station 20 receives the signal on a reverse link (or forward link) from the terminal 10, and detects the power control bit from the reverse link. A power control bit processor 26 of the base station 20 processes the detected power control bit to adjust the strength of the transmit signal from the base station 10 (or terminal 10). Here, the power control bit processor 26 commands a transmit power controller 27 to increase signal strength if the transmit signal strength is to be increased from an analysis of the power control bit, and to decrease the transmit signal strength if vice versa.

The strength of the power-controlled forward link signal is measured by the signal strength measurer 12 of the terminal 10. Thus, a closed-loop power control for the forward link is achieved.

A controller 11 of the terminal 10 performs other tasks including generation of transmit and receive data bits, which are not shown in FIG. 1, while sequentially controlling the closed-loop power control procedure.

Significant factors which impact closed-loop power control include: 1) the rate of power control adjustments; 2) the time required to implement power control through a closed loop; and 3) how to insert a power control bit. These factors require careful consideration as they have great influence on both signal maintenance and service quality.

FIG. 2 illustrates power control as implemented in a conventional IS-95 CDMA system. With a power control unit time selected to be 1.25 msec., power control will be performed 800 times per second. A number of operations are performed in the 1.25 msec interval including; 1) measuring the strength of a receive signal; 2) comparing the receive signal strength with a reference signal strength; and 3) generating and inserting a power control bit for insertion into the forward traffic channel, as shown in FIG. 2. The insertion position of the generated power control bit, shown in diagram as 213, is determined by a long-period PN (Pseudo-Random) code within the first two thirds of the 1.25 msec interval. Further, the power control bit is transmitted for a pre-determined time. Thus, power control bit transmit time can be equally distributed when transmitting a power control bit to a plurality of terminals thereby reducing interference, which can be cause by the power control bit, between a transmit signal and other signals.

The conventional IS-95 power control method, however, suffers from certain shortcomings in that the power control speed is limited to 800 Hz and the time delay associated with closed-loop power control ranges from 1.25 to 2.5 msec.

The first problem (i.e., the 800 HMhz speed limitation) with the conventional power control limits both the period and extent of power change which can be controlled. As is well known in the art, the power change period is inversely proportional to the speed of a mobile terminal. That is, as the terminal moves at higher speeds, the power change period becomes shorter and thus power change interval becomes more frequent. As a result, a power control performed at a rate of 800 Hz is not effective for a signal of a mobile terminal moving at high speeds.

In addition, considering the closed-loop power control is based not on a current power strength but on a previous measured power strength, a longer time delay in the closed-loop power control leads to power control being applied to the previous signal. In this case, power control is nullified if power change becomes large. That is, as time delay increases and power change gets larger, information contained within a power control bit which depends on measured signal strength is less accurate because it loses its relation with the current signal strength, thereby increasing a change in signal strength.

Each of the aforementioned shortcomings associated with power control as practiced in the prior art serves to increase the change of signal strength thereby decreasing the service quality. Accordingly, it would be highly advantageous to provide a method for maintaining a high reference signal strength to keep service quality at a predetermined level.

SUMMARY OF THE INVENTION

An object of the present invention is, therefore, to provide a closed-loop power control method in a CDMA mobile communication system, in which power change can be controlled for a rapidly moving terminal by performing a high-speed power control at various speeds.

Another object of the present invention is to provide a power control method in a CDMA communication system, in which the change in signal strength can be followed with a minimum time delay by minimizing the time delay in a closed-loop power control.

A further object of the present invention is to provide a power control method in a CDMA mobile communication method, in which signal interference caused by power control bits can be minimized by equally distributing power control bits on a temporal axis with introduction of bit-unit frame staggering.

These and other objects are achieved by a high speed power control bit insertion method for regulating power control between a base station and a mobile terminal in which power control bits are inserted in appointed positions in a transmission signal and as a result the power control bit insertion cycle is reduced.

The power control bit inserting method of the present invention is intended to maximize time used for demodulating inserted power control bits in a receiver and frequency diversities, so that bit errors [possibly] generated from power control bits are reduced and thus power control accuracy is increased. In accordance with the present method, for a particular bit error rate, the energy allocated to power control bits can be reduced.

Another additional advantage of the method of the present invention is the ability to perform closed-loop power control at various speeds. This is achieved by differentiating demodulation of power control bits in a receiver.

In one aspect of the invention, a method for inserting a power control bit in a signal transmitted between a base station and a terminal comprises the steps of: setting a unit time to a power control group period; allocating n-bit data to each signal path, where each signal path is comprised of a real and imaginary part; dividing the power control group period by the number of signal paths; inserting a power control bit in each divided segment, so that the insertion positions in the real and imaginary parts of each signal path are spaced from each other by n/2 bits; and the start position of the real signal path of each frequency is inserted at an appointed bit position of the corresponding frequency.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENT

The present invention relates to CDMA (Code Division Multiple Access) mobile communication system, and in particular, to a method for performing high speed power control. A method is provided for achieving closed-loop power control in a CDMA mobile communication system, in which power change is controlled for a high-speed mobile terminal. Power control is performed at various rates from 800 Hz, to 4800 Hz. Changes in signal strength are tracked with a minimum time delay by minimizing time delay in the closed-loop power control. Thus, a signal strength change can be bounded to a minimum power change to reference power ratio, thereby improving service quality and increasing system capacity. In addition, signal interference possibly caused in high-speed power control can be minimized by equally distributing power control bits with introduction of bit-unit frame staggering.

Figure 1:
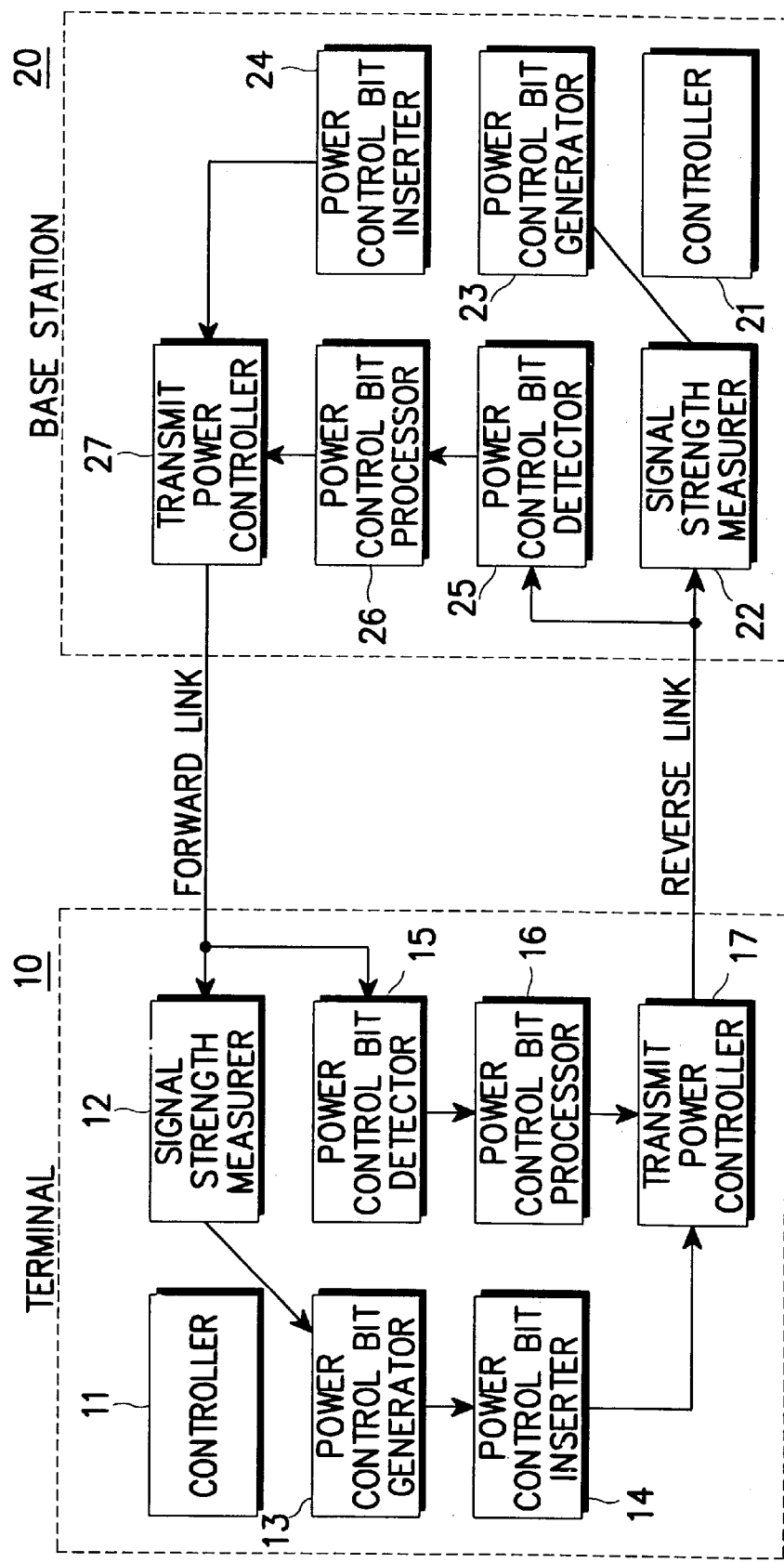
FIG. 1 is a general schematic block diagram of closed-loop power control in accordance with the prior art.
Figure 2:
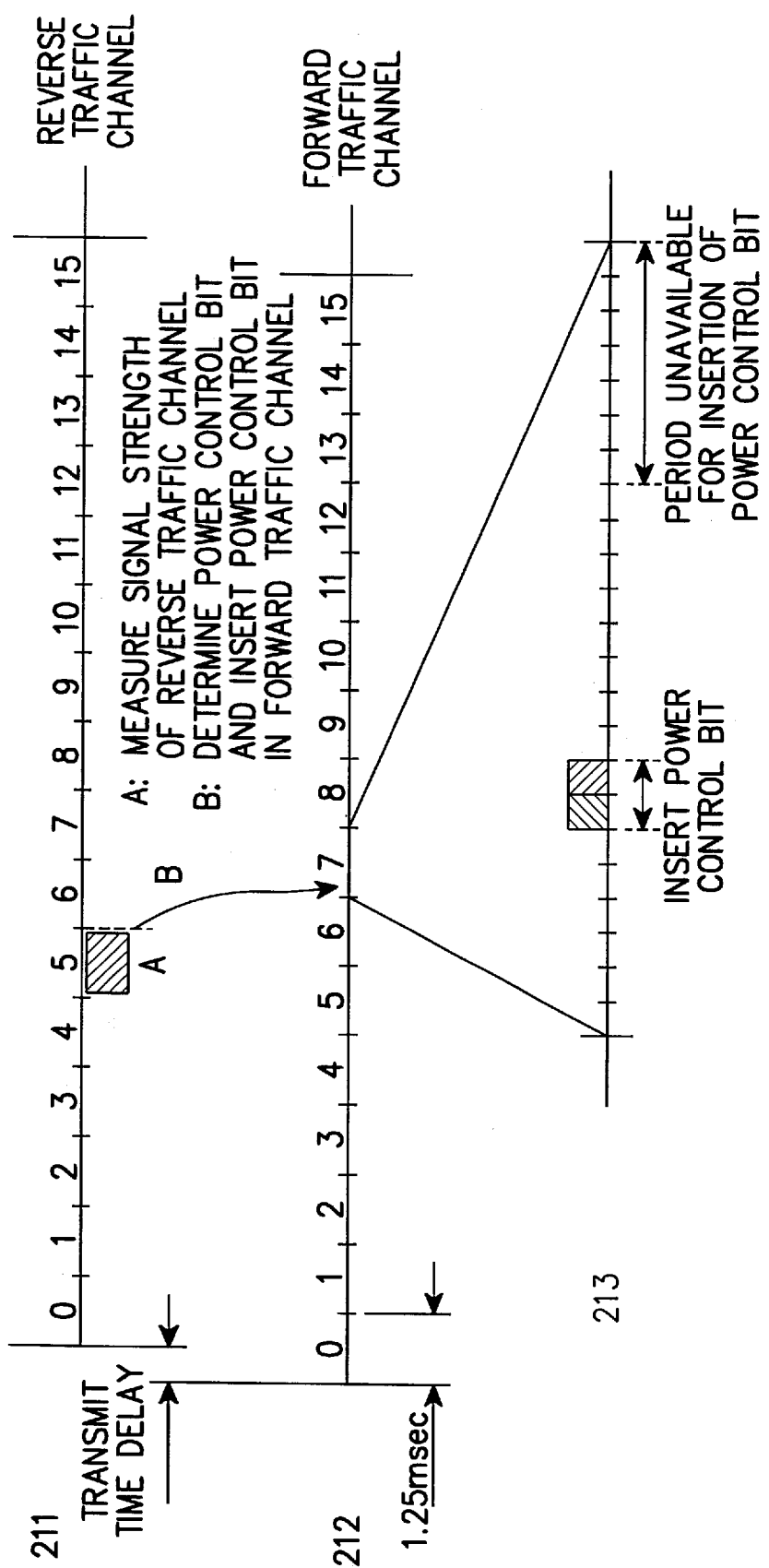
FIG. 2 is a diagram illustrating a method of inserting a closed-loop power control bit into a transmit signal in an IS-95 environment.
Figure 3:
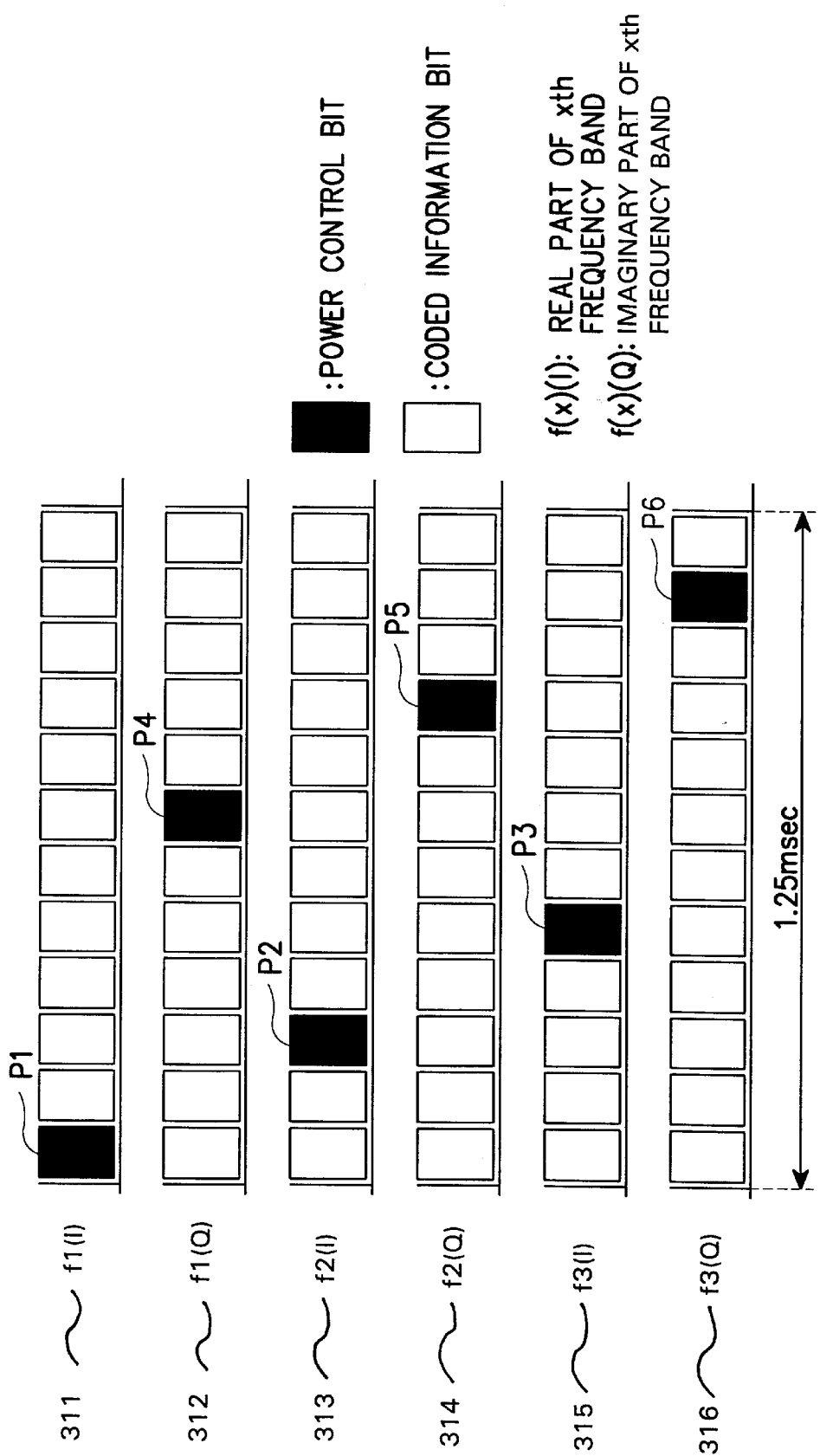
FIG. 3 is a diagram illustrating a power control bit inserting method for high-speed power control in the case of generating a transmit signal in three adjacent frequency bands according to the present invention.
Figure 4:
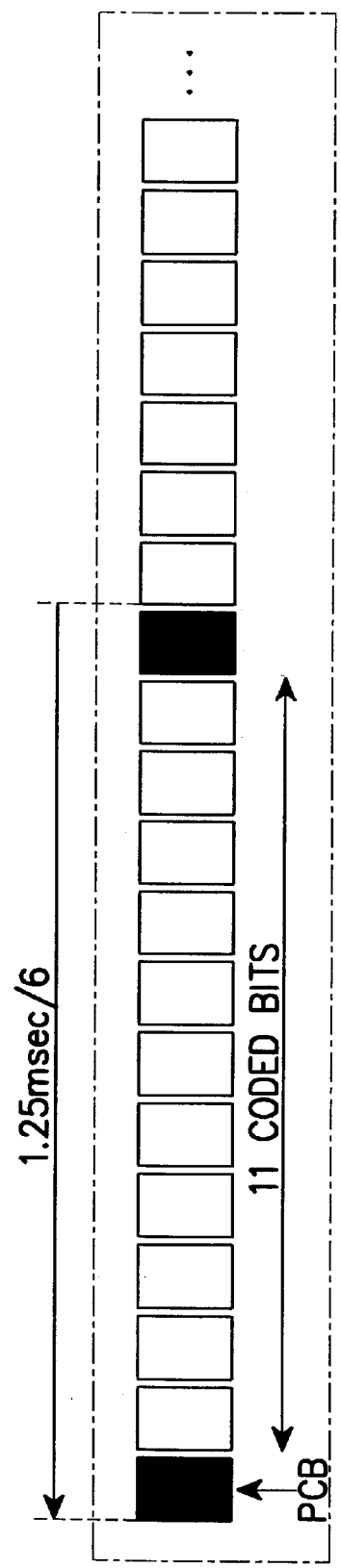
FIG. 4 is a diagram illustrating a power control bit inserting method for high-speed power control in the case of generating a transmit signal in a single wide frequency band according to the present invention.
Figure 5:
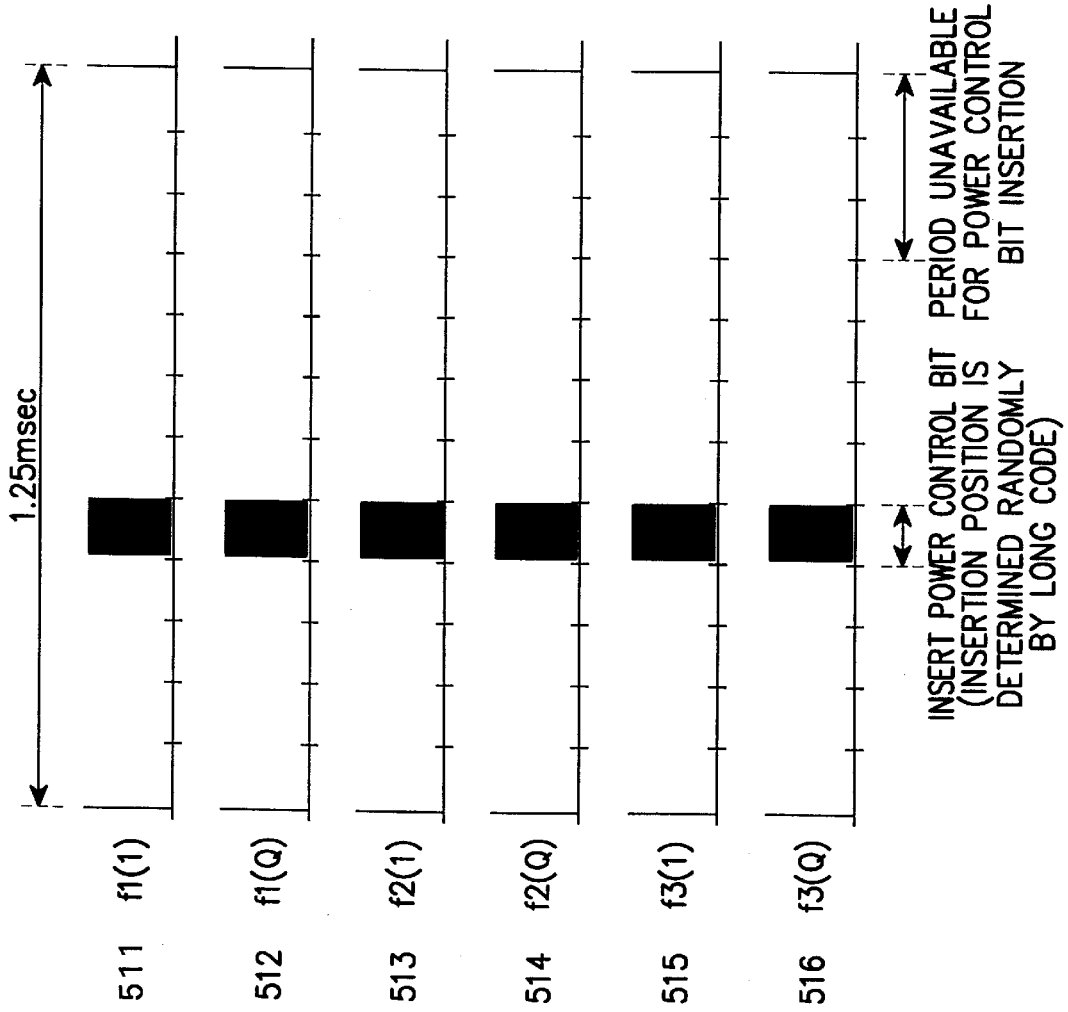
FIG. 5 is a diagram illustrating a power control bit inserting method in IS-95, which is extended to transmit a signal in three adjacent frequencies according to the present invention.

FIGS. 3 and 4 illustrate a power control bit inserting method in accordance with an embodiment of the present invention. FIG. 3 illustrates the case where a signal is transmitted, in three available adjacent frequency bands (i.e., f1, f2, f3). FIG. 4 illustrates the case where a single wide frequency band is used for signal transmission. FIG. 5 illustrates an extension of the power control bit inserting method for IS-95, in which three adjacent frequency bands are used. The power control bit insertion method of FIG. 5 allows no high-speed power control at or above 800 Hz.

Referring now to FIG. 3, three adjacent frequencies f1, f2, and f3 are used for signal transmission. There is associated with each frequency band two independent signal transmission paths, a real part I and an imaginary part Q. As shown in FIG. 3, 1.25 msec is assigned as a unit time dedicated to regulated power control bit insertion. For the unit time of 1.25 msec, six signal transmission paths f1(I), f1(Q), f2(I), f2(Q), f3(I), and f3(Q) are available, as indicated by reference numerals 311 to 316. That is, two signal transmission paths are available from each of the three frequencies f1 to f3. Each signal transmission path is allocated 12 bits per unit time, (i.e., 1.25 msec), as shown in FIG. 3. Here, 1.25 msec corresponds to power control group in IS-65. The power control group of 1.25 msec is divided into six segments and power control bits P1 to P6 are inserted in their corresponding segments, such that a power control bit is inserted in each 1.25 msec/6 segment. As a result, a power control bit frequency is increased from 800 Hz to 4800 Hz.

In other words, if the unit time corresponding to the standardized power control group in IS-95 is 1.25 msec, and two signal transmission paths are available, a divided segment corresponds to the value obtained by dividing the unit time by two signal transmission paths (1.25 msec/2).

By virtue of segmenting the power control group, a number of actual available power control frequencies (i.e., 800, 1600, 2400, and 4800 Hz) are made available. The selection of a particular power control bit frequency can be made either during the power control bit determination or after the power control bits are demodulated in a receiver.

In the former case, the actual power control frequency is given as 4800 Hz when six power control bits are generated to have independent control information within 1.25 msec. When three independent pairs of power control bits are generated having independent control information, the actual power control frequency is 2400 Hz. The rate is further reduced to 1600 Hz when two independent sets of power control bits are generated having independent control information, where each set includes three power control bits, and in the worst case the rate is reduced to 800 Hz when the six power control bits have the same information.

Figure 6:
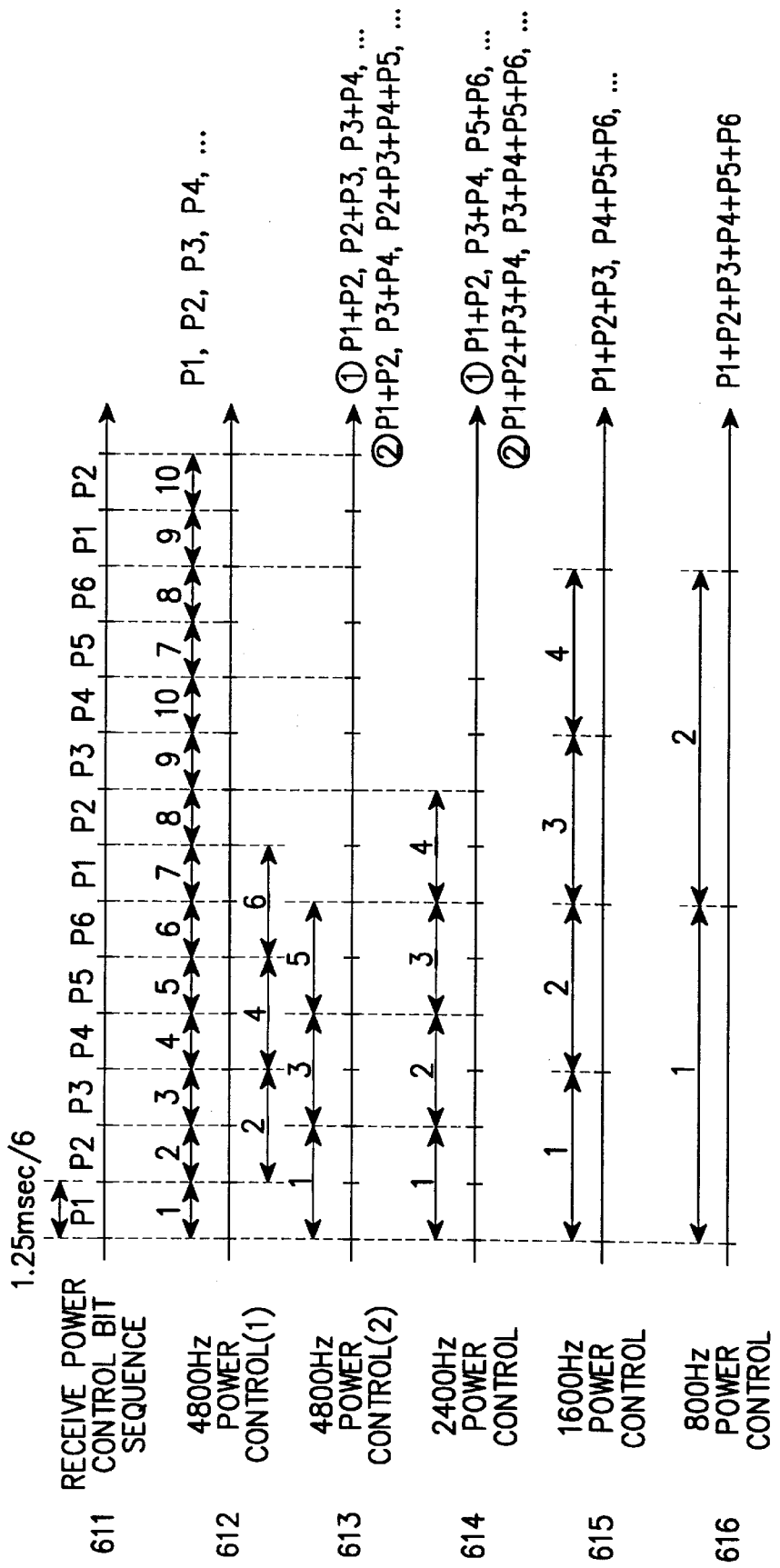
FIG. 6 is a diagram illustrating a method of achieving various power control speeds through regulated power control bit insertion in a receiver according to the present invention.

The latter case is illustrated by FIG. 6. A power control speed of 4800 Hz results when power control is performed once for each power control bit after demodulation in a receiver, as indicated by reference numeral 612 of FIG. 6. A power control speed of 2400 Hz results when power control is performed once at the average of two power control bits after demodulation in a receiver, as indicated by reference numeral 614. Power control speeds of 1600 Hz and 800 Hz are realized when power control is performed once as the average of three power control bits and six power control bits respectively. This is indicated by reference numbers 615 and 616, respectively.

It is to be appreciated that even if power control is performed at the average of two or more power control bits as indicated by 613 in FIG. 6, the power control speed can be maintained at 4800 Hz by shifting in one power control bit unit and averaging the result. In accordance with this procedure, more power control speeds are made available.

That is, a power control speed is 2400 Hz may be achieved by shifting in a two power control bit unit and calculating the average of power control bits. It therefore follows that a power control speed of 1600 Hz may be achieved by shifting in a three power control bit unit, a rate of 1200 Hz may be achieved by shifting in a four power control bit unit, and a rate of 960 Hz may be achieved by shifting in a five power control bit unit.

It is to be appreciated that advantages can be realized by decreasing the power control speed by averaging power control bits as well as utilizing the available power control speeds. That is, both time and frequency diversity may be realized by utilizing multiple frequency bands for transmitting power control bits which are averaged and selectively choosing different time points for demodulating the power control bits.

FIG. 4 illustrates a single wide frequency band used for signal transmission. Since signal transmission is performed using a single wide-band frequency, power control bits are disposed between data bits in a predetermined interval. It is important to note that the various power control speeds are also available in this case. For the case of a single wide frequency band, the diversity in power control speeds through averaging the power control bits is followed by diversity in a temporal axis and in frequency selection for power control bits, obtained from use of a wide frequency band. Therefore, the regulated power control bit insertion methods in FIGS. 3 and 4 show the same performance.

By contrast, with reference to FIG. 5, the power control bit insertion extended from IS-95 allows only the power control speed of 800 Hz since only one power control is possible for 1.25 msec.

An additional advantage with the regulated power control bit insertion of the present invention is a decrease in closed-loop power control delay. Time delays at 4800 Hz and 800 Hz are shown respectively in FIGS. 7 and 8.

Figure 7:
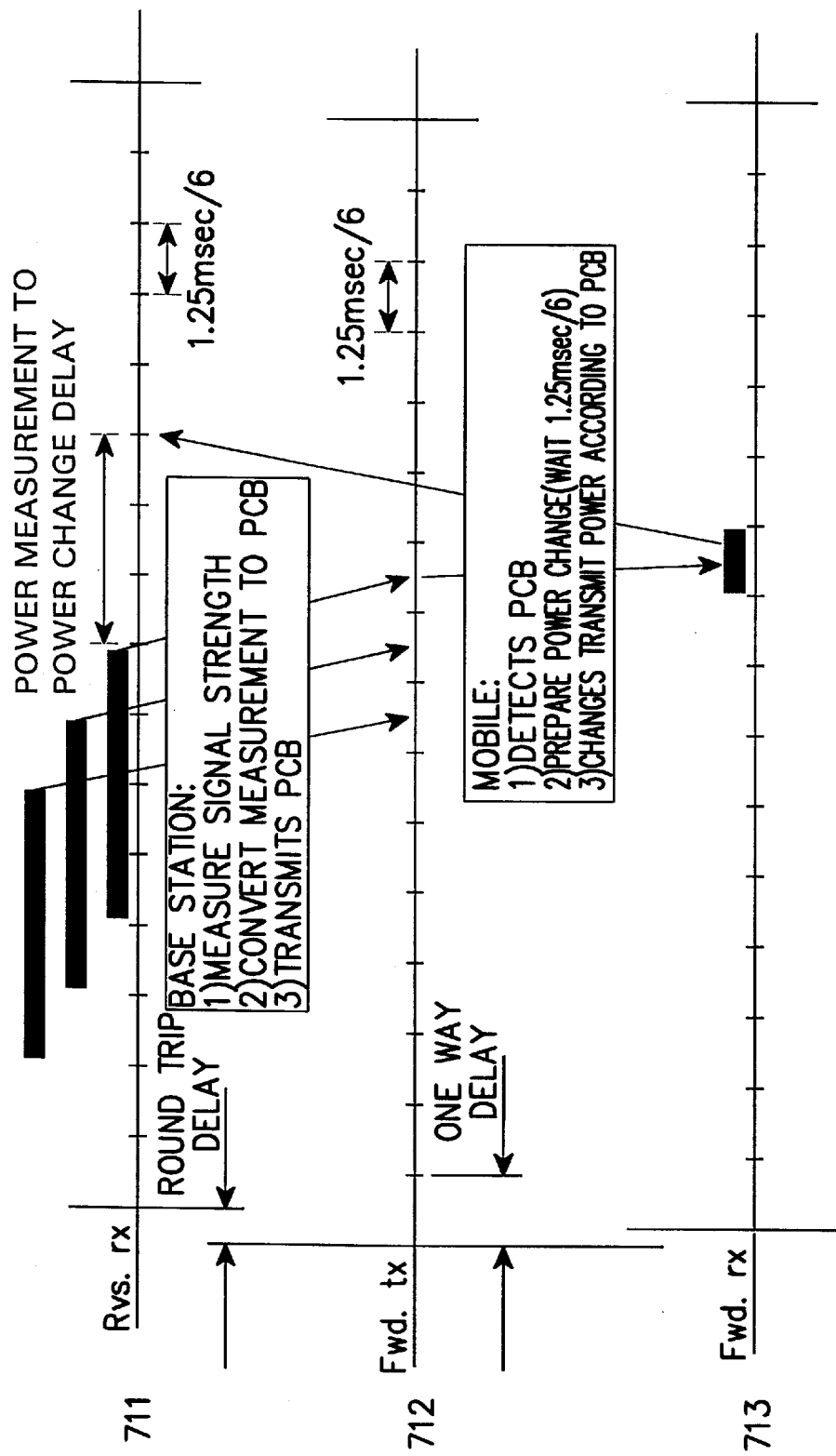
FIG. 7 is a timing diagram illustrating time delay at a power control speed of 4800 Hz in a closed-loop power control according to the present invention.

Referring now to FIG. 7, a power control bit (PCB) is generated as a result of measuring the signal strength from a signal source in a 1.25 msec/6 interval. The PCB is then transmitted to a signal source which may be in a predetermined 1.25 msec/6 interval. The signal source, in response, analyzes the received PCB to adjust the transmit power. Thus, power control is done 3×1.25 msec/6 after the signal strength measurement. The time delay of measuring, transmitting and analyzing the received PCB may be increased due to a radio transmission delay, but can be adjusted within 1.25 msec/6. Therefore, since a time delay of about 3×1.25 msec/6 is involved at 4800 Hz as shown in FIG. 7, the time delay is remarkably decreased, as compared to the conventional power control bit insertion.

Figure 8:
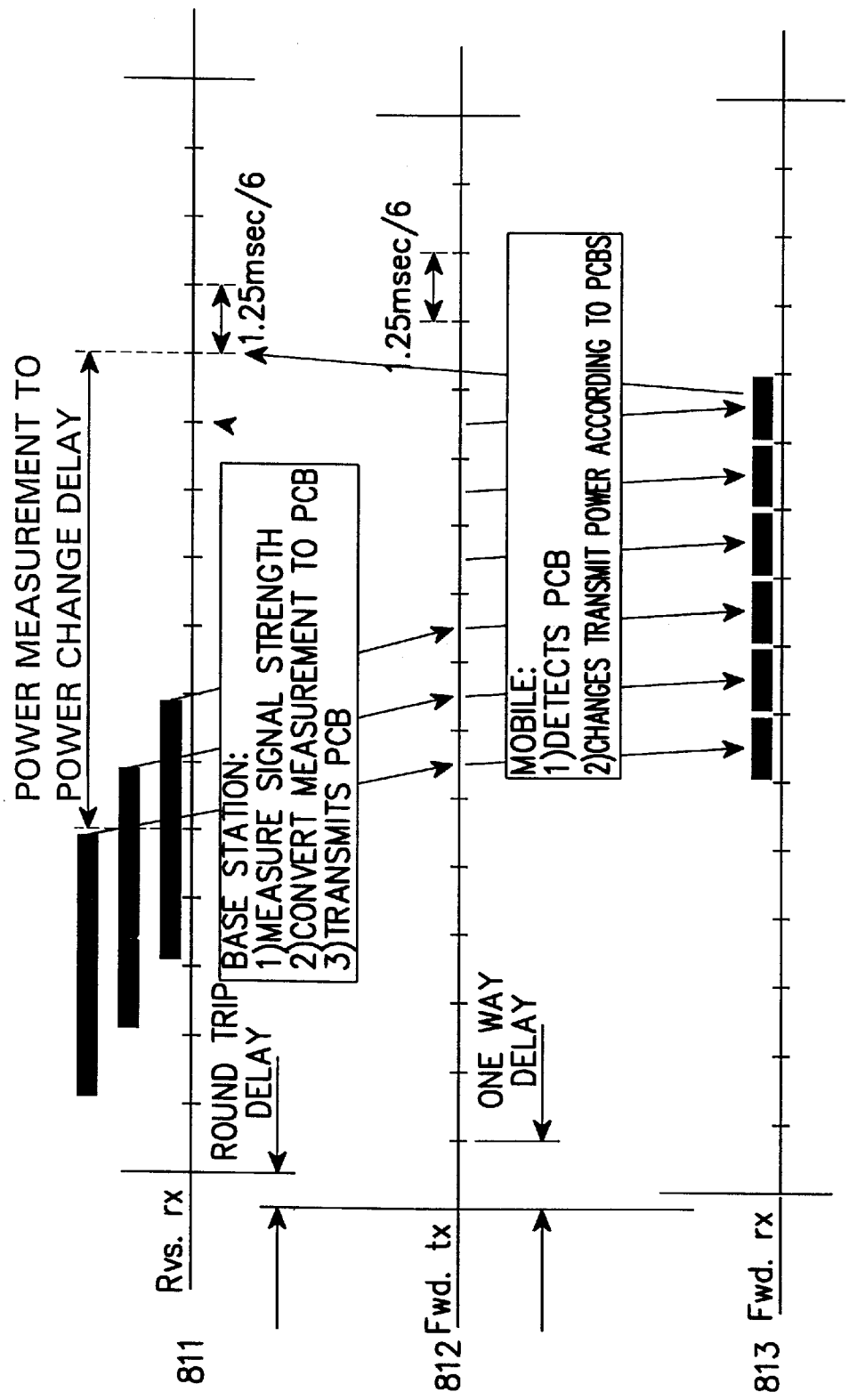
FIG. 8 is a timing diagram illustrating time delay at a power control speed of 800 Hz in a closed-loop power control according to the present invention.

In FIG. 8, a time delay at 800 Hz is about 7×1.25 msec/6 according to the same procedure as at 4800 Hz, which is decreased from 2.5 msec in IS-95.

Power Control Bit Insertion Method

A power control bit generally has relatively high power as compared to a data bit because it controls transmit power. This is necessary because bit errors which may occur in the power control bits can cause transmit power to shift in a direction opposite to what is desired, thereby degrading service quality. As such, the relatively high power of the power control bit acts as an interference signal to other signals and thus reduces system capacity. To minimize the interference of the power control bit signal, an insertion position of the power control bit is selected by a long code in IS-95, to thereby effect an equal distribution of power control bits on a temporal axis. However, this method also limits the power control speed to 800 Hz.

The present invention describes a regulated power control bit inserting method in order to increase the power control speed and reduce time delay involved in closed-loop power control. However, simultaneous existence of plural power control bits, which are inserted in a predetermined time period, may incur serious interference with other signals and data bits. To overcome this [problem] limitation, bit-unit frame staggering is proposed herein. Frame staggering refers to delaying the start point of a data bit frame by a predetermined time. Hence the bit-unit frame staggering implies that frame staggering is performed in a data bit unit, the data bit unit referring to one bit. The bit-unit frame staggering allows an equal distribution of inserted power control bits on a temporal axis so that interference caused by the high power of power control bits can be reduced thereby enabling high-speed power control.

Figure 9:
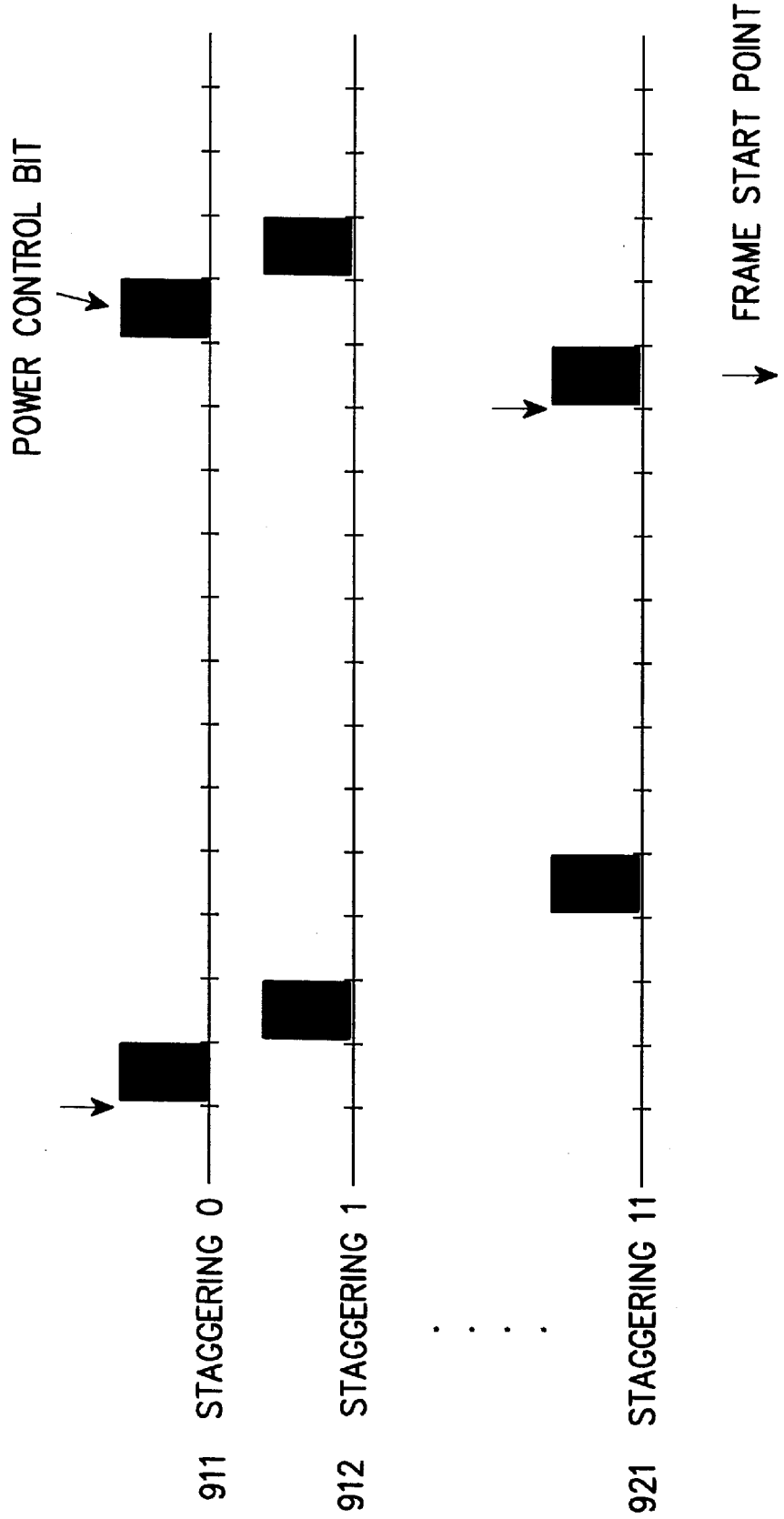
FIG. 9 is a timing diagram illustrating a distribution of power control bits with bit-unit frame staggering applied according to the present invention.

FIG. 9 is a timing diagram showing that power control bits can be equally distributed on a temporal axis by utilizing bit-unit frame staggering.

Figure 10:
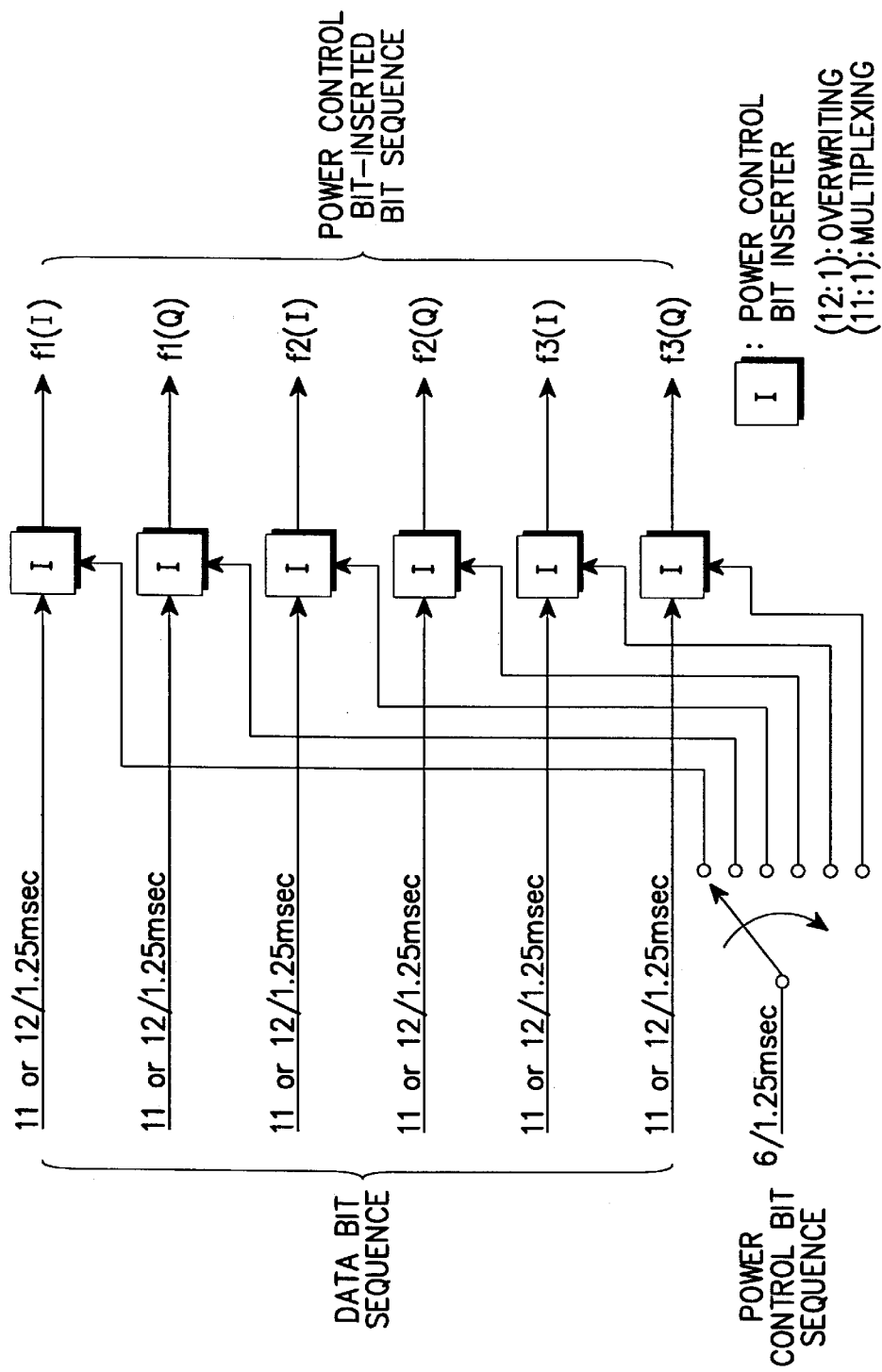
FIG. 10 is a schematic block diagram illustrating hardware for performing power control bit insertion when a transmit signal is generated in three adjacent frequency bands.
Figure 11:
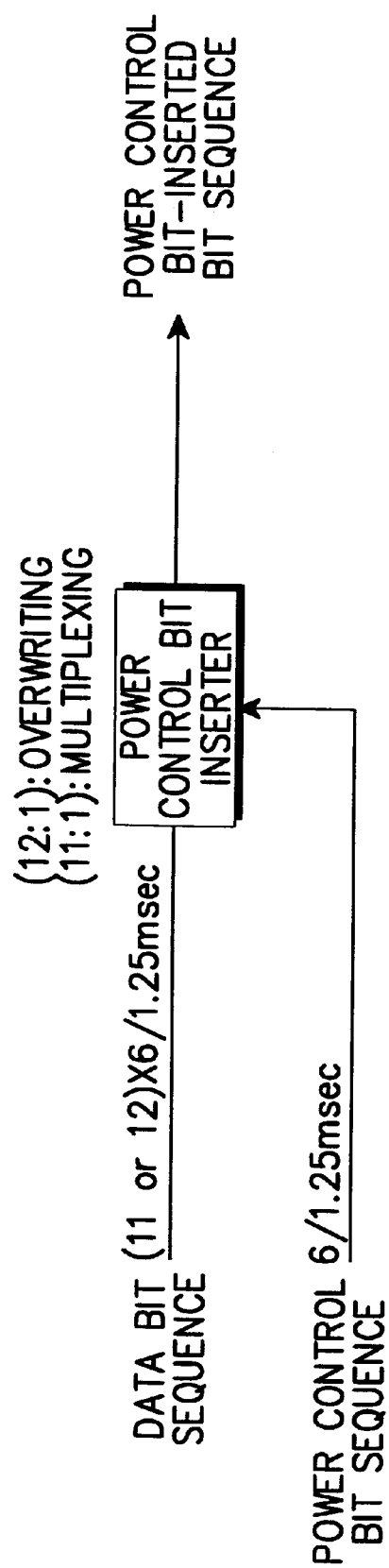
FIG. 11 is a block diagram illustrating hardware constitution for power control bit insertion when a transmit signal is generated in a single wide frequency band.
Figure 12:
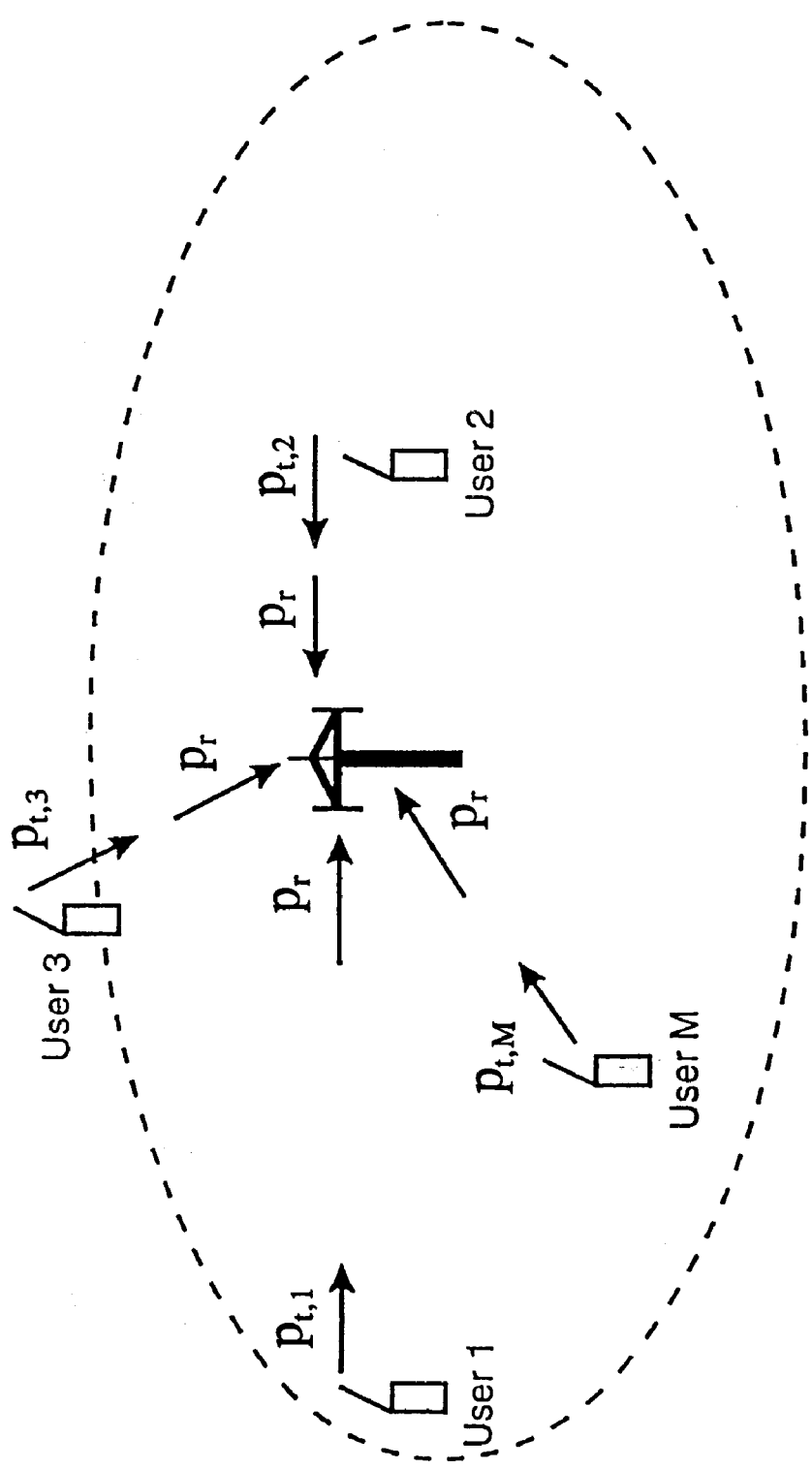
FIG. 12 is a prior art diagram illustrating the application of power control in a CDMA mobile communication system.

FIGS. 10 and 11 illustrate hardware embodiments of power control bit insertion for performing high-speed power control according to the present invention. In FIG. 10, three frequency bands are used to transmit a signal. As previously stated, each frequency band comprises two signal paths associated with the real and imaginary parts for each frequency. As such, a total of six signal (i.e., data bit) paths are available. Each path transmits 11 or 12 data bits for 1.25 msec. Six power control bits are transmitted for 1.25 msec with one power control bit being transmitted on each data path. As illustrated in FIG. 10, a sequence of power control bits are distributed into six paths of a single data bit sequence for distribution in the 1.25 msec interval.

The power control bits can be inserted by overwriting or multiplexing. With respect to multiplexing, despite the disadvantage of a reduced number of data bits supportable for 1.25 msec, multiplexing decreases the undesirable influence of power control bits on data bits. Overwriting decreases the transmit signal to noise ratio without reducing the number of data bits because data bits are damaged and power bits are inserted in place of the damaged data bits.

FIG. 11 illustrates a hardware embodiment of the power control bit insertion using a single wide-band frequency. The hardware operates in a fashion similar to that described in FIG. 10.

In summary, the method of the present invention for inserting power control bits is advantageous in that the power control unit time can be reduced to 1.25 msec/6 and a power control speed can be increased to 4800 Hz, thereby enabling high-speed power control. The first effect of achieving high-speed power control is reduction of time delay in a closed-loop power control so that [an] effective power control can be performed even against a large and rapid change in signal strength. Secondly, since various power control speeds can be obtained besides the high-speed power control, power control can be flexibly implemented. Furthermore, diversity on time and frequency of power control bits reduces the likelihood of bit errors possibly caused by the power control bits and thus more accurate power control may be achieved. As a consequence of more accurate power control, service quality and system capacity are improved. In addition, the utilization of bit-unit frame staggering prevents interference caused by high power associated with power control bits and ensures advantages of the regulated power control bit insertion.

What is claimed is:

1. A method for inserting a power control bit in a transmission signal communicated between a base station and at least one terminal, said transmission signal being transmitted from a plurality of adjacent frequency bands, each of said plurality of adjacent frequency bands characterized as a signal path having a real part and an imaginary part, said method comprising the steps of:
   (a) setting a unit time;
   (b) allocating n-bits of data to be transmitted from each of said plurality of signal paths;
   (c) obtaining a plurality of divided segments by dividing the unit time by the number of signal paths; and
   (d) inserting at starting points delayed by a predetermined time a power control bit in each of said plurality of divided segments.

2. A method for inserting a power control bit in a transmission signal communicated between a base station and at least one terminal, said transmission signal being transmitted from a single wide-band frequency, said method comprising the steps of:
   setting a unit time; and
   inserting at starting points delayed by a predetermined time a power control bit between data bits in a predetermined bit interval, wherein the bit interval varies based upon a power control speed.

3. In a transmission system including a base station and at least one terminal, a method for removing interference caused by the insertion of a plurality of power control bits in a transmission signal, wherein said plurality of power control bits are inserted in designated positions between data bits in a predetermined bit interval within the power control group period, and the predetermined bit interval varies based upon a power control speed, said method comprising the step of equally distributing power control bits at starting points delayed by a predetermined time on an axis.

4. The transmission system of claim 3, wherein the step of equally distributing power control bits on an axis is performed by delaying the start point of a data bit frame for a predetermined time.

5. A method of controlling a power of a transmission signal communicated between a base station and at least one terminal in a CDMA mobile communication system, said transmission signal being transmitted in a plurality of adjacent frequency bands, each of the adjacent frequency bands having signal paths comprising a real part and an imaginary part, said method comprising the steps of:
   allocating a unit of time for controlling the power of the transmission signal;
   obtaining a plurality of divided segments by dividing the unit time by the number of signal paths;
   inserting at starting points delayed by a predetermined time a power control bit for controlling the power of the transmission signal into data bits during the period of time corresponding to each of the divided segments; and transmitting the data bits including the power control bit through each of the signal paths.

6. The method of claim 5, wherein the transmitted power control bits form independent sets and the number of the independent sets is based on a desired frequency of the power control.

7. The method of claim 6, wherein the frequency of the power control is decreased by averaging the power control bits.

8. The method of claim 5, wherein one power control bit is transmitted on each of the signal paths during the unit time.

9. A method of controlling a power control frequency of a mobile communication system, said mobile communication system having signal paths between a base station and at least one terminal for transmitting power control bits, said method comprising the steps of:

generating N sets of power control bits to be transmitted within a predetermined time frame, wherein each set is different from each other;

inserting at starting points delayed by a predetermined time the N sets of power control bits into designated positions between data bits; and transmitting the data bits including the power control bits through the signal path, wherein N≧1 and the power control frequency depends on the quantity of N.

10. A device for controlling a power control frequency of a mobile communication system, said mobile communication system having signal paths between a base station and at least one terminal for transmitting power control bits, said device comprising:

a power control bit generator for generating N sets of power control bits, wherein each set is different from each other;

a power control bit inserter for inserting at starting points delayed by a predetermined time the N sets of power control bits into designated positions between data bits; and a transmitter for transmitting the data bits including the power control bits through the signal paths, wherein N≧1 and the power control frequency depends on the quantity of N.

11. The device of claim 10, further comprising a distributor for distributing each of the power control bits to each of the respective signal paths.

12. A method for inserting a power control bit in a transmission signal communicated between a base station and at least one terminal, said transmission signal being transmitted from a plurality of adjacent frequency bands, each of said plurality of adjacent frequency bands characterized as a signal path having a real part and an imaginary part, said method comprising the steps of:

(a) measuring a received signal power;

(b) generating a plurality of power control bits by comparing the measured power to a threshold value;

(c) obtaining a plurality of divided segments by dividing n-bits of data to be transmitted by the number of frequency bands;

(d) inserting at least one power control bit into each of the segments through frame staggering, wherein the position of power control bits are different in each frequency band; and (e) transmitting each of the segments including the power control bit in each segment on the frequency bands.

13. A method for transmitting power control bits in a CDMA communication system wherein a plurality of power control bits are inserted in designated positions between data bits in a predetermined bit interval within a power control group period for transmission, said method comprising the steps of:

(a) determining a power control speed based on the number of power control bits having independent control information;

(b) generating a plurality of power control bits to be inserted in the power control group period at the determined power control speed; and (c) inserting the generated power control bits in the power control group and transmitting the inserted power control bits with the data bits.

14. The method of claim 13, wherein step (b) further comprises generating at least one set of power control bits in the power control group at the predetermined power speed.

15. A method for controlling power in a CDMA communication system wherein a power control group period is set as a unit time and a plurality of power control bits are inserted in designated positions in a predetermined time interval at a power control speed within the power control group period for transmission, said method comprising the steps of:

(a) determining the power control speed based on the number of power control bits having independent control information in a received signal;

(b) generating the inserted power control bits in the power control group at the predetermined power control speed; and (c) performing a power control of a signal to be transmitted by calculating an average of the generated power control bits.

16. The method of claim 15, wherein step (b) further comprises generating independent power control bits as sets of power control bits within the power control group period at the power control speed.

* * * * *